Patented July 24, 1951

2,561,566

UNITED STATES PATENT OFFICE 2,561,566

PROCESS OF FLUXING METAL PARTS IN JOINING THEM

Alden P. Edson, Hartford, and Isaac L. Newell, Wethersfield, Conn., assignors to United Aircraft Corporation, East Hartford, Conn., a corporation of Delaware No Drawing. Application June 22, 1946, Serial No. 678,683

7 Claims. (Cl. 113—112)

The present invention relates to the joining of metal parts by means of solder, and more particularly to fluxing of the metals to be joined. The term solder as used herein includes not only the metals and alloys such as those of lead and tin which melt below 1000° F., but also metals and alloys of melting temperatures higher than 1000° F. such as the class of materials commonly known as silver solders and brazing metals. In like manner, our term soldering is used in the broader sense and includes such operations as silver soldering, brazing, welding, and sintering.

Objects and advantages of the invention will be set forth in part hereinafter and in part will be obvious herefrom, or may be learned by practice with the invention, the same being realized and attained by means of the processes and compositions pointed out in the appended claims.

The invention consists in the novel processes and compositions herein shown and described.

The art of joining metals together by such operations as brazing, welding, soldering, and the like, has heretofore employed as fluxes compounds which remain after the joining operation. These compounds are often difficult to remove from the metals either due to insolubility in the solvent employed, or due to the geometry of the assembly. They are usually highly corrosive in the presence of moisture and may eventually lead to premature failure of the metals being joined, or of the bond, and may interfere with paint adhesion, electro-plating and other methods of finishing or protecting the surface of metals. Some of the most widely used fluxes for the joining of metals have employed salts of fluorine and boron which are liquid at the temperature of joining. The action of these fluxes is as follows:

1. To react with and dissolve metallic oxides, sulphides, and other corrosion products present on the surface of the metal.
2. To spread over, wet and cover the surface of the metal, preventing oxidation of the metal.
3. To lower the interfacial tension between the metals being joined and the alloy being used for the soldering, brazing or welding operation.

An object of the present invention is to provide a method of fluxing in which are used materials which are not objectionable from the standpoint of etching, corrosion, or residual flux on the parts being joined, and yet actively flux the metal parts being joined so that high strength bonds are obtained.

A stable non-oxidizing atmosphere, containing a fluorine compound from the group in which the fluorine is in the monovalent state and connected in the molecule to an element having an atomic weight of greater than 3, which compound is gaseous at normal temperatures and pressures (70° F.-760 mm.) is particularly suitable as a flux.

Of the compounds containing fluorine in the monovalent state, one consisting, in part, of boron, known as boron trifluoride is especially suitable for use in obtaining high strength bonds in the joining of metals. By "stable non-oxidizing atmosphere" is meant a gas without detrimental action on the metals employed. For example, if the metals used are straight carbon steel, then an atmosphere of pure dry nitrogen would be suitable as a carrier for the fluorine compound. If the metal used would react with nitrogen, then an atmosphere of pure dry helium would be satisfactory for the carrier gas. The stable non-oxidizing atmosphere may also consist wholly of the fluorine compound without the use of any inert carrier gas.

Excellent joints can be obtained between metal parts with a variety of alloys, viz: Silver, copper, silver-copper, copper-manganese, copper-nickel, copper-nickel-manganese, silver - copper - zinc, silver-copper-zinc-nickel, silver-copper-zinc-cadmium, silver-cadmium-nickel, copper-tin, silver-copper-zinc-tin, and copper-zinc, when using the gaseous flux of the composition given above. These, of course, do not represent all of the alloys which may be used for joining by this process, but are given to show the wide range of application of this flux.

The activity of the flux increases with the temperature of joining, and stronger joints are obtained at the higher temperatures. Tests which have been made up to temperatures of 2250° F. have been satisfactory, and there is no apparent reason why even higher temperatures would not give even better fluxing action. It is believed that the fluxing compounds function in the following manner:

1. They are substantially stable against and without detrimental action upon the metals present in the parts being joined or the solder.
2. They react with the contaminants present upon the parts being joined and the solder used in such fashion as to (a) reduce them to the elemental metallic state, (b) convert them into a compound of melting temperature lower than the temperature used for soldering, (c) convert them into compounds having appreciable volatility at soldering temperature, which compounds may be dispersed in the fluxing atmosphere and exhausted with such atmosphere.

No objectionable residue remains on parts formed or joined by use of our processes and compositions when the parts are free from dirt and oxide prior to joining. In the case of parts contaminated with oxides prior to joining, any residue from the fluxing action is slight and proportional to the oxides originally present.

Example No. I

In the manufacture of a hollow steel propeller blade comprised of a sheet steel shell airfoil section brazed to a hollow central core member, the shell interior and core exterior are first cleaned by conventional chemical and mechanical methods. A clean sheet of silver solder 0.010" thick and approximately 4" wide, consisting of approximately 54% silver, 40% copper, 5% zinc, and 1% nickel, is placed over the tip of the core extending down both sides toward the shank as far as a bond between the shell and core is desired. The shell is sealed to the core exterior to form a gas tight volume with a steel pipe opening into the leading and trailing edge cavities. The blade is placed in a refractory alloy die which is clamped shut. The shell volume is then thoroughly purged with dry nitrogen and then with boron trifluoride, exhausting the boron trifluoride through 2 inches of mercury so as to maintain a pressure of approximately 1 p. s. i. in the shell volume. After completely purging the shell with boron trifluoride, flow of this gas through the shell is discontinued and only sufficient gas is supplied to maintain shell pressure. Gas pressure of 16 p. s. i. is applied to the core interior and the die and blade assembly are run into a furnace maintained at a temperature of 1600° F. to 1675° F. The blade and die are left in the furnace for sufficient time to bring the blade substantially to furnace temperature and allow melting and flow of the brazing alloy. At the end of this time, the blade and die are withdrawn from the furnace and cooled. The shell volume is purged with dry nitrogen until free from boron trifluoride to produce a blade with the shell and core joined and free from objectionable deposits.

Example No. II

In the manufacture of electric contact points in which a tungsten disc is copper brazed to a steel member, assemblies of the steel member, copper foil, and tungsten disc are placed in a heated muffle which is sealed. The air is purged from the muffle by a flow of argon gas, and boron trifluoride is admitted to the muffle. The temperature is raised to 2200° F. and the joining of the metals takes place. The muffle is allowed to cool, and, when the temperature is below the solidification point of copper, the muffle is again purged with argon. The muffle is then allowed to cool to room temperature and the assemblies removed. No cleaning is necessary on these parts.

It is to be understood that the present invention is not confined to the flux mentioned in these examples. For example, very useful results may be obtained by the use of tungsten hexafluoride or silicon tetrafluoride. The metals which can be joined are not confined to those stated in the examples given. Among those which have actually been joined are Phosphor bronze, an alloy comprising 67% nickel-33% copper
18-8 stainless steel, 13 chrome stainless steel
Nickel, moly high speed steel
Beryllium copper, tungsten
70-30 brass, gold
Copper, an alloy comprising 90% nickel-10% chromium
Silver, an alloy comprising 94% nickel-1% silicon-2% aluminum-0.5% iron-2.5% manganese
Carbon steel, alloy steel These, of course, do not represent all of the groups which may be joined by this process, but are given to show the wide range and application of these fluxes.

The invention in its broader aspects is not limited to the specific processes and compositions described but departures may be made therefrom within the scope of the accompanying claims without departing from the principles of the invention and without sacrificing its chief advantages.

What is claimed is:

1. The process of joining metal parts by solder which comprises maintaining a stable gaseous atmosphere which is substantially inert at soldering temperatures with respect to the metals being treated, which stable gaseous atmosphere has as its active component a compound gaseous at normal temperatures and pressures consisting of monovalent fluorine connected to an element having an atomic weight greater than 3, and cleaning the metal parts and solder by subjecting them to said stable gaseous atmosphere at soldering temperature until the metal parts have been bonded by the solder.

2. A process as claimed in claim 1 in which the fluorine compound is removed from the atmosphere surrounding the metals after soldering by urging with gas inert with respect to the metals being treated.

3. A process as claimed in claim 1 in which the fluorine is connected to at least one element capable of forming an oxide which is stable and liquid under soldering conditions.

4. A process as claimed in claim 1 in which the fluorine is connected to at least one element capable of forming an oxide which is stable and volatile under soldering conditions.

5. A process as claimed in claim 1 in which the fluorine compound is boron trifluoride.

6. A process as claimed in claim 1 in which the fluorine compound is silicon tetrafluoride.

7. A process as claimed in claim 1 in which the fluorine compound is tungsten hexafluoride.

ALDEN P. EDSON.
ISAAC L. NEWELL.

REFERENCES CITED

The following references are of record in the file of this patent:

UNITED STATES PATENTS

| Number | Name | Date |
|---|---|---|
| 1,536,944 | Steenstrup | May 5, 1925 |
| 2,157,918 | Rankin | May 9, 1939 |
| 2,166,109 | Karmazin | July 18, 1939 |
| 2,276,847 | Kelley | Mar. 17, 1942 |
| 2,291,399 | Miller | July 28, 1942 |
| 2,426,467 | Nelson | Aug. 26, 1947 |
| 2,438,721 | Spencer | Mar. 30, 1948 |

OTHER REFERENCES

"Amer. Mach."; Controlled Heat Treating Atmospheres—November 12, 1942.